US010122189B1

(12) United States Patent
Walker

(10) Patent No.: US 10,122,189 B1
(45) Date of Patent: Nov. 6, 2018

(54) ORGANIZER AND CHARGER FOR MULTIPLE PERSONAL ELECTRONIC DEVICES

(71) Applicant: Omar Walker, Brooksville, FL (US)

(72) Inventor: Omar Walker, Brooksville, FL (US)

(\*) Notice: Subject to any disclaimer, the term of this patent is extended or adjusted under 35 U.S.C. 154(b) by 147 days.

(21) Appl. No.: 15/244,090

(22) Filed: Aug. 23, 2016

(51) Int. Cl.
| H02J 7/00 | (2006.01) |
| H01F 37/00 | (2006.01) |
| B65D 25/04 | (2006.01) |
| H02J 50/10 | (2016.01) |
| H02J 7/02 | (2016.01) |

(52) U.S. Cl.
CPC ............ *H02J 7/0027* (2013.01); *B65D 25/04* (2013.01); *H02J 7/025* (2013.01); *H02J 50/10* (2016.02); *H02J 2007/0059* (2013.01); *H02J 2007/0062* (2013.01)

(58) Field of Classification Search
CPC .......... H02J 7/00; H02J 7/0013; H02J 7/0027; H02J 7/025; H02J 50/00; H02J 50/10; H02J 2007/0059; H02J 2007/0062; B65D 25/04
USPC .......................................... 307/104; 320/108
See application file for complete search history.

(56) References Cited

U.S. PATENT DOCUMENTS

| 7,952,322 | B2* | 5/2011 | Partovi | .................. H01F 5/003 320/108 |
| 8,054,042 | B2 | 11/2011 | Griffin, Jr. | |
| 8,102,147 | B2 | 1/2012 | Jung | |
| 8,115,451 | B2 | 2/2012 | Griffin, Jr. | |
| 8,593,802 | B1 | 11/2013 | Strauser | |
| D710,797 | S | 8/2014 | Awiszus | |
| 2009/0033564 | A1* | 2/2009 | Cook | .................... G06F 1/1616 343/702 |
| 2012/0014056 | A1 | 1/2012 | Chen | |
| 2013/0099730 | A1 | 4/2013 | Yoon | |

\* cited by examiner

*Primary Examiner* — Hal Kaplan
(74) *Attorney, Agent, or Firm* — Kyle A. Fletcher, Esq.

(57) ABSTRACT

The organizer and charger for multiple personal electronic devices is a domestic article that is adapted for use with one or more personal data devices. The organizer and charger for multiple personal electronic devices is a stand that receives the one or more personal data devices for storage. The organizer and charger for multiple personal electronic devices further comprises charging circuit that provides the energy required to wirelessly charge each of the one or more personal data devices stored within the organizer and charger for multiple personal electronic devices. The organizer and charger for multiple personal electronic devices comprises a stand, a charging circuit, and a cable.

18 Claims, 4 Drawing Sheets

ORGANIZER AND CHARGER FOR MULTIPLE PERSONAL ELECTRONIC DEVICES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of circuit arrangements for charging and depolarizing batteries, more specifically, an inductive charging stand for personal data devices.

SUMMARY OF INVENTION

The organizer and charger for multiple personal electronic devices is a domestic article that is adapted for use with one or more personal data devices. The organizer and charger for multiple personal electronic devices is a stand that receives the one or more personal data devices for storage. The organizer and charger for multiple personal electronic devices further comprises a charging circuit that provides the energy required to wirelessly charge each of the one or more personal data devices stored within the organizer and charger for multiple personal electronic devices.

These together with additional objects, features and advantages of the organizer and charger for multiple personal electronic devices will be readily apparent to those of ordinary skill in the art upon reading the following detailed description of the presently preferred, but nonetheless illustrative, embodiments when taken in conjunction with the accompanying drawings.

In this respect, before explaining the current embodiments of the organizer and charger for multiple personal electronic devices in detail, it is to be understood that the organizer and charger for multiple personal electronic devices is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the organizer and charger for multiple personal electronic devices.

It is therefore important that the claims be regarded as including such equivalent construction insofar as they do not depart from the spirit and scope of the organizer and charger for multiple personal electronic devices. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
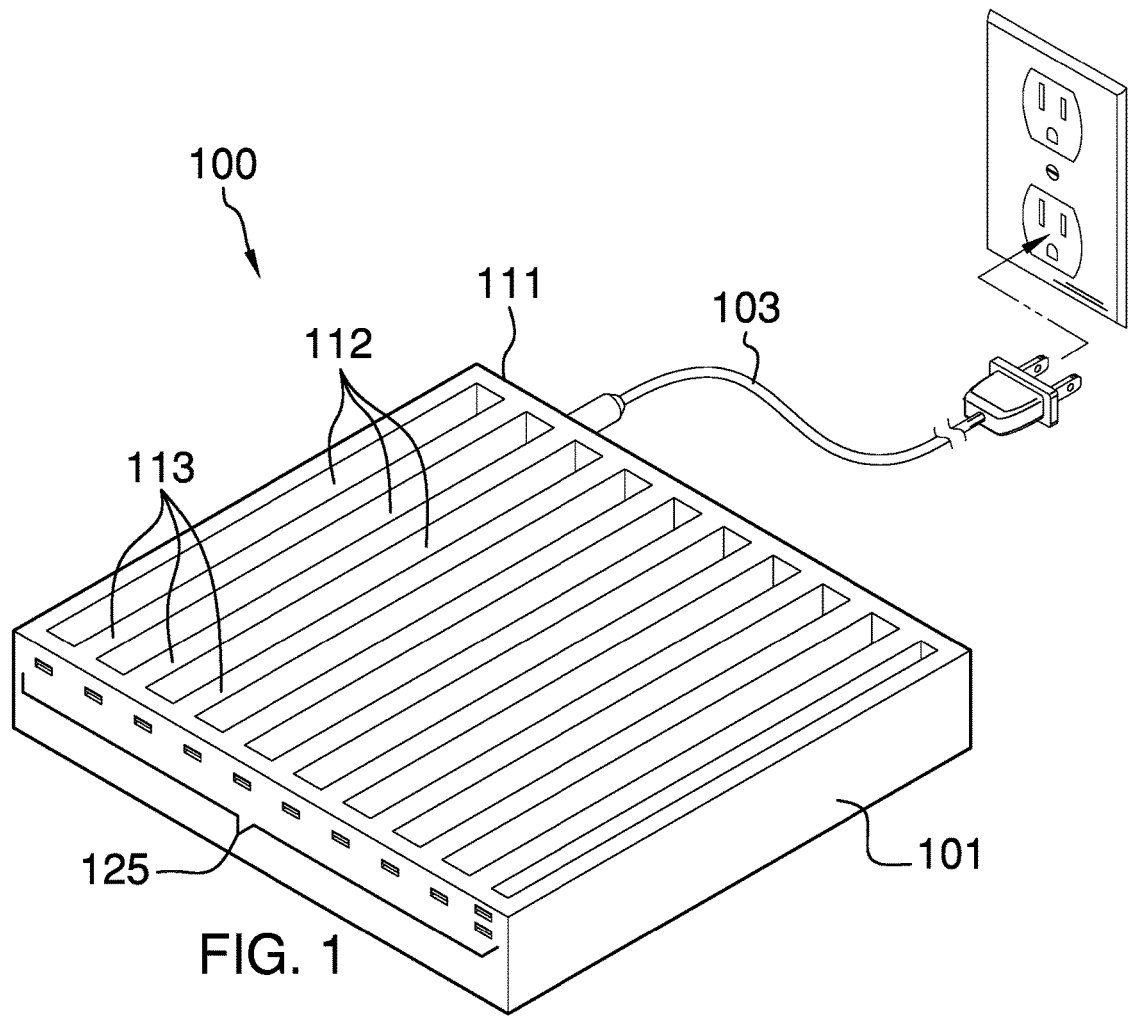
FIG. 1 is a perspective view of an embodiment of the disclosure.
Figure 2:
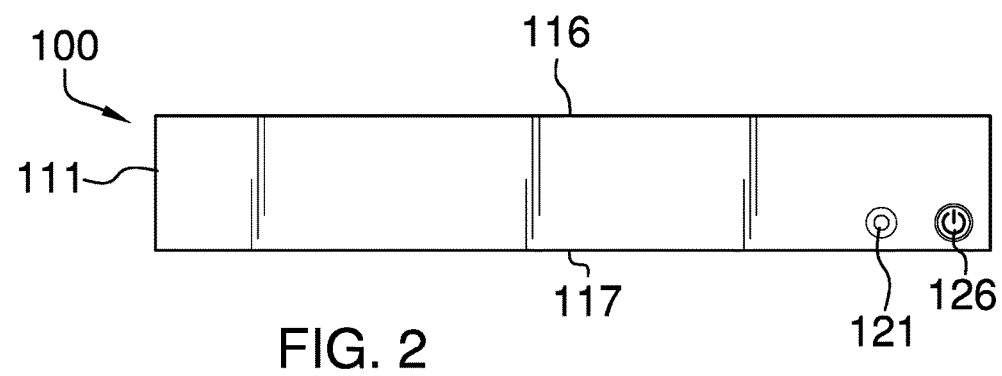
FIG. 2 is a back view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The organizer and charger for multiple personal electronic devices 100 (hereinafter invention) comprises a stand 101, a charging circuit 102, and a cable 103. The invention 100 is a domestic article that is adapted for use with one or more personal data devices 131. The invention 100 is a stand 101 that receives the one or more personal data devices 131 for storage. The one or more personal data devices 131 is a collection of individual personal data devices 132. Each individual personal data device (hereinafter PDD) 132 further comprises a PDD inductive coil 133, a PDD charging circuit 134, and a PDD battery 135. The PDD inductive coil 133 receives energy from the charging circuit 102. The PDD charging circuit 134 converts the energy received by the PDD inductive coil 133 into electric energy suitable for charging the PDD battery 135. The PDD battery 135 is a commercially available battery that is used to power the individual personal data device 132. The invention 100 further comprises charging circuit 102 that provides the energy required to wirelessly charge each of the one or more personal data devices 131 stored within the invention 100. The charging circuit 102 draws power from the national electric grid 136. The charging circuit 102 is stored within the stand 101. The cable 103 connects the charging circuit 102 to the national electric grid 136.

In the first potential embodiment of the disclosure, the cable 103 is commercially available (IEC C13/C14) cable that is adapted to connect to a wall outlet connected to the national electric grid 136. As shown most clearly in FIG. 5, the cable 103 connects the national electric grid 136 to the charging circuit 102.

The charging circuit 102 receives power from the national electric grid 136 through the cable 103 and processes the power to provide energy for use by the one or more personal data devices 131. As shown most clearly in FIG. 5, the charging circuit 102 comprises a power port 121, an AC AC converter 122, an AC DC converter 123, an inductive coil 124, a plurality of USB ports 125 and a switch 126. The inductive coil 124 is connected to the AC AC converter 122. The plurality of USB ports 125 are connected to the AC DC converter 123. The switch 126 connects the AC AC converter 122 and the AC DC converter 123 to the power port 121.

As shown in the fifth potential embodiment of the disclosure, the power port 121 is a port that is designed to receive a plug from the cable 103 in order to draw power from the national electric grid 136. The switch 126 is a commercially available switch that is used to make or break the circuit between: 1) the power port 121 and the AC AC converter 122; and, 2) the power port 121 and the AC DC converter 123. The AC AC converter 122 receives the electric power from the power port 121 and converts the frequency and voltage to a predetermined frequency and voltage that is then applied to the inductive coil 124. The specific frequency and specific voltage selected is determined by the input requirement specified by the one or more personal data devices 131. It is expected by the inventor that the frequency specification will range between 100 kHz and 8 MHz with a high probability that the frequency specification will fall between the ranges of 100 kHz and 400 kHz and 6.5 MHz and 7.0 MHz. Methods to design the AC AC converter 122 described in this paragraph and well known and documented in the electrical arts. The AC DC converter 123 takes power from the power port 121 and converts this power into a DC voltage that is consistent with the specified power requirements for a USB port. The AC DC converter 123 is connected to the plurality of USB ports 125 such that electrical power is provided to each of the plurality of USB ports 125.

Figure 5:
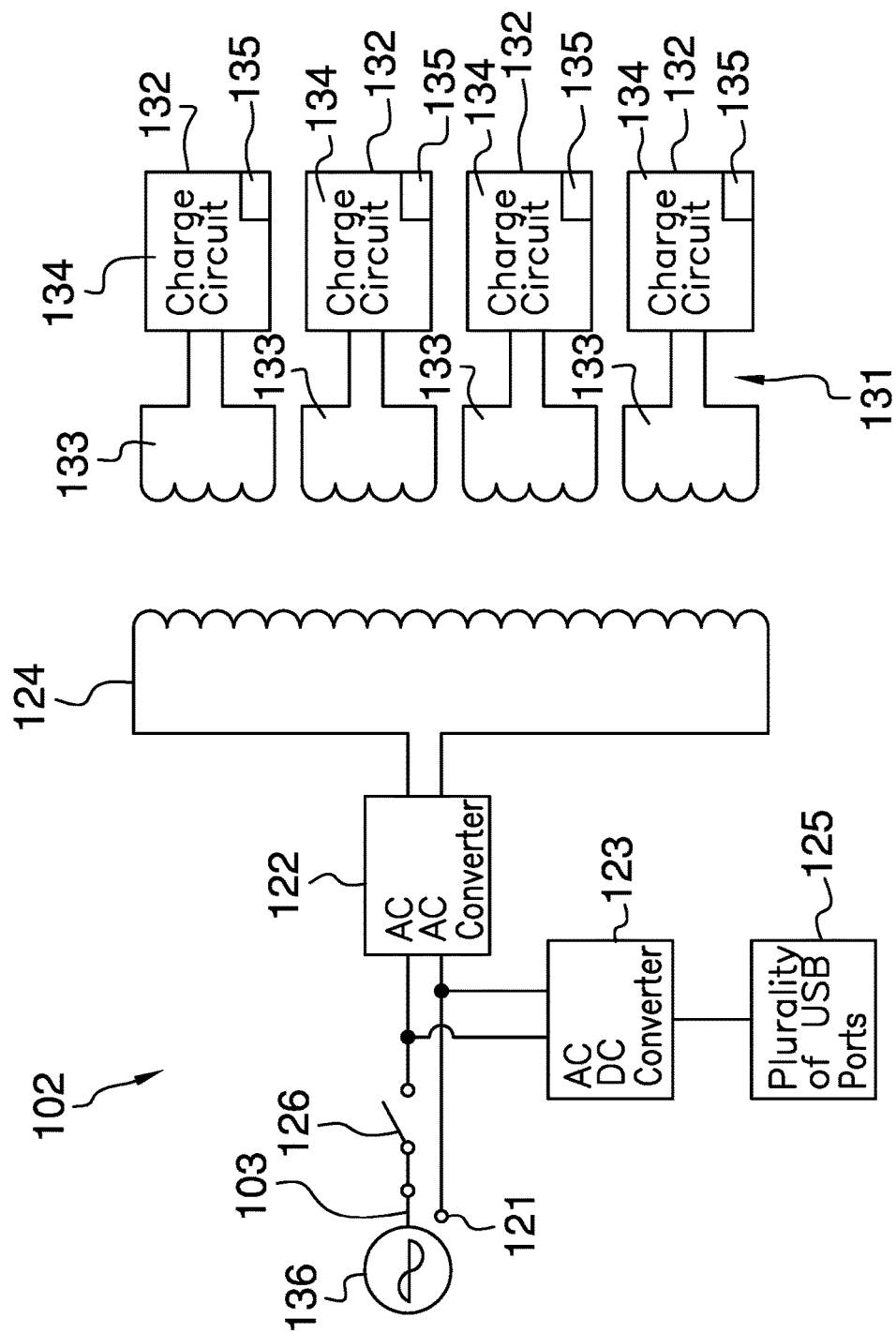
FIG. 5 is a schematic view of an embodiment of the disclosure.

The theory of operation of the charging circuit 102 is described in this paragraph. As shown in FIG. 5, the AC AC converter 122 provides a voltage at a frequency to the inductive coil 124. As the voltage at a frequency passes through the inductive coil 124, an electromagnetic field is generated. If an individual personal data device 132 is placed in proximity to the inductive coil 124 an inductive coupling occurs between the PDD inductive coil 133 of the individual personal data device 132 and the inductive coil 124. In a process similar to how a transformer works, this inductive coupling generates an electric current within the PDD inductive coil 133, which is fed to the PDD charging circuit 134. The PDD charging circuit 134 then processes the electric current generated from the PDD inductive coil 133 into electrical energy that is stored in the PDD battery 135.

The stand 101 is a structure comprising a frame 111, a plurality of slots 112, and a plurality of dividers 113. The frame 111 is further defined with a first face 116 and a second face 117. As shown most clearly in FIG. 6, the frame 111 is a rectangular block structure that further comprises a bottom cavity 114 and a slot cavity 115.

The slot cavity 115 is a first empty space that is formed in the first face 116. As shown most clearly in FIG. 1, the plurality of slots 112 is formed by inserting the plurality of dividers 113 into the slot cavity 115 such that a containment slot is formed between two adjacent dividers selected from the plurality of dividers 113 or between a divider selected from the plurality of dividers 113 and the frame 111. Each containment slot is a considered to be a slot contained within the plurality of slots 112. Each slot selected from the plurality of slots 112 is sized to receive an individual personal data device 132 for storage and charging.

Figure 3:
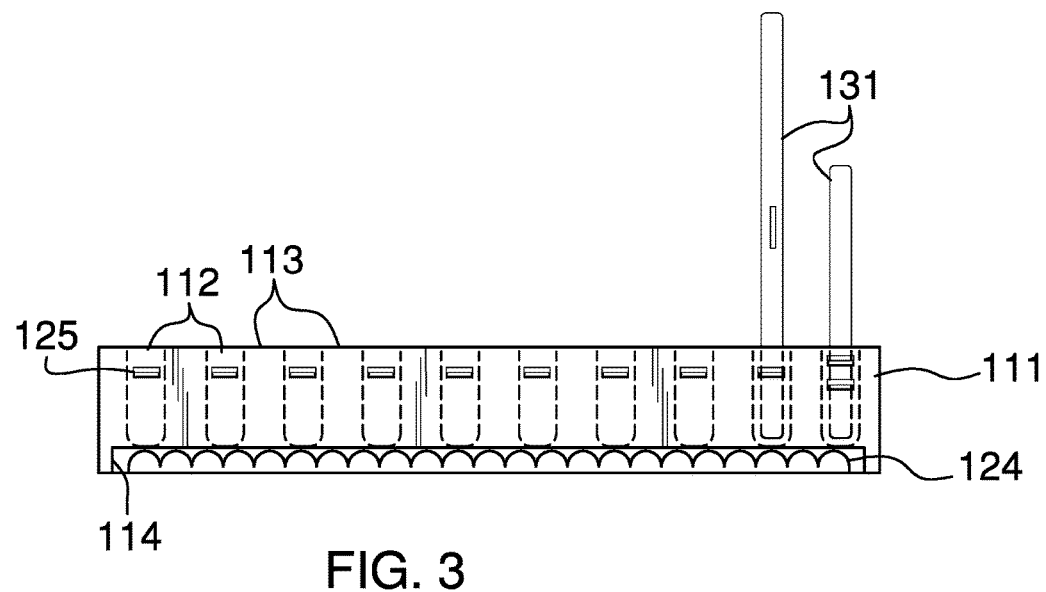
FIG. 3 is a front view of an embodiment of the disclosure.
Figure 4:
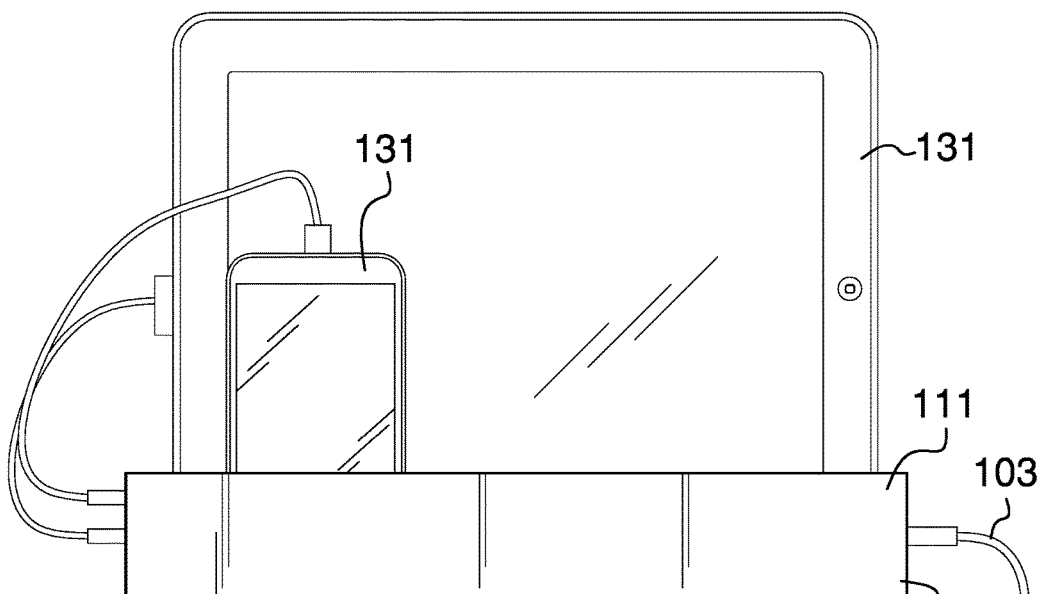
FIG. 4 is a side view of an embodiment of the disclosure.
Figure 6:
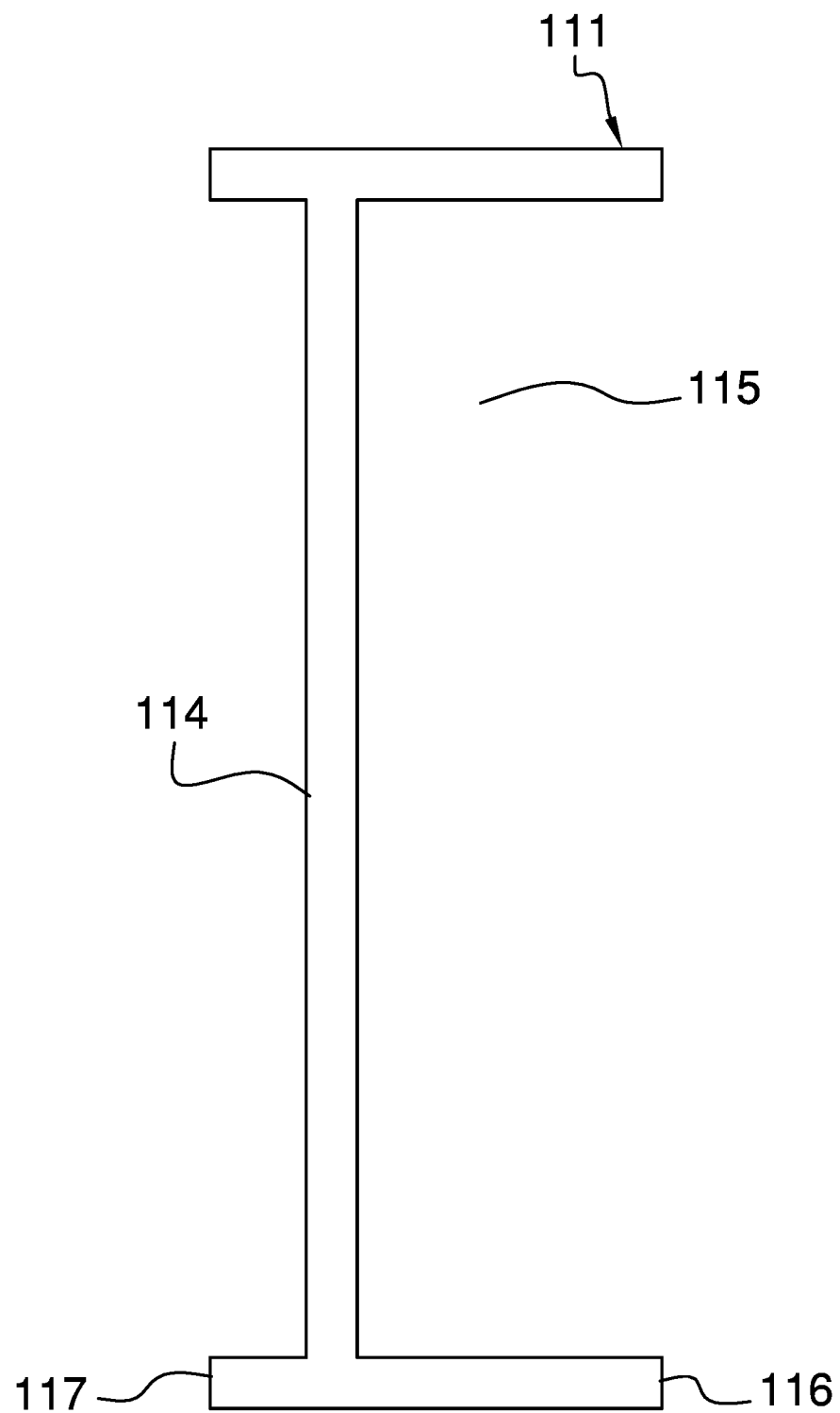
FIG. 6 is a detail view of an embodiment of the disclosure.

As shown most clearly in FIGS. 6 and 3, the bottom cavity 114 is a second empty space that is formed in the second face 117 of the frame 111. As shown if FIG. 3, the inductive coil 124 is installed in the bottom cavity 114 such that the inductive coil 124 runs underneath each of the plurality of slots 112. The switch 126, the AC AC converter 122 and the AC DC converter 123 are further mounted in the bottom cavity 114. As shown in FIG. 1, the plurality of USB ports 125 are mounted in the frame 111 such that they are readily accessible.

To use the invention 100, the invention 100 is connected to the national electric grid 136 and the switch 126 is closed. Each individual personal data device 132 is inserted into a slot selected from the plurality of slots 112 in an orientation that is specified by the manufacturer of the individual personal data device 132. As shown most clearly in FIG. 4, should the individual personal data device 132 not be equipped to receive power wirelessly the individual personal data device 132 can be powered using the a USB port selected from the plurality of USB ports 125.

In the first potential embodiment of the disclosure, the stand 101 is formed from wood. Methods and techniques to make the stand 101 are well known and documented in the carpentry arts. The cable 103 is readily and commercially available. The charging circuit 102 can be readily designed and assembled from commercially available components by those skilled in the electrical arts.

The following definitions were used in this disclosure:

AC: As used in this disclosure, AC is an acronym for alternating current.

Battery: As used in this disclosure, a battery is a container consisting of one or more cells, in which chemical energy is converted into electricity and used as a source of power.

DC: As used in this disclosure, DC is an acronym for direct current.

PDD: As used in this disclosure, PDD is an acronym for personal data device.

Personal Data Device: As used in this disclosure, a personal data device is a handheld device that is used for managing personal information and communication. Examples of personal data device include, but are not limited to, cellular phones, tablets and smart phones.

Plug: As used in this disclosure, a plug is a device at the end of an electrical cord that connects a cable to an electrical device or a source of electricity.

Port: As used in this disclosure, a port is an electrical termination that is used to connect a first electrical circuit to a second external electrical circuit. In this disclosure, the port is designed to receive a plug.

National Electric Grid: As used in this disclosure, the national electric grid is a synchronized and highly interconnected electrical network that distributes energy in the form of electric power from a plurality of generating stations to consumers of electricity.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

USB: As used in this disclosure, USB is an acronym for Universal Serial Bus, which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A domestic article comprising:
    a stand, a charging circuit, and a cable;
    wherein the domestic article is adapted for use with one or more personal data devices;
    wherein the domestic article receives the one or more personal data devices;
    wherein the one or more personal data devices is a collection of individual personal data devices;
    wherein each individual personal data device further comprises a PDD inductive coil;
    wherein the charging circuit provides energy to the PDD inductive coil;
    wherein the charging circuit draws power from the national electric grid;
    wherein the charging circuit is stored within the stand;
    wherein the cable connects the charging circuit to the national electric grid;
    wherein the charging circuit comprises a power port, an AC AC converter, an AC DC converter, an inductive coil, a plurality of USB ports and a switch;
    wherein the inductive coil is connected to the AC AC converter;
    wherein the plurality of USB ports are connected to the AC DC converter;
    wherein the switch connects the AC AC converter to the power port;
    wherein the switch connects the AC DC converter to the power port.

2. The domestic article according to claim 1 wherein the inductive coil is inductively coupled to the PDD inductive coil.

3. The domestic article according to claim 2
    wherein the power port receives a plug from the cable;
    wherein the switch makes and breaks the circuit between the power port and the AC AC converter;
    wherein the switch makes and breaks the circuit between the power port and the AC DC converter.

4. The domestic article according to claim 3
    wherein the AC AC converter converts electric power from received from the power port and converts the electric power to a predetermined frequency and voltage;
    wherein the predetermined frequency and voltage is applied to the inductive coil.

5. The domestic article according to claim 4 wherein the frequency applied to the inductive coil ranges between 99 kHz and 8 MHz.

6. The domestic article according to claim 5 wherein the AC DC converter receives electric power from the power port and converts the electric power into a DC voltage.

7. The domestic article according to claim 6 wherein the AC DC converter is connected to the plurality of USB ports such that electrical power is provided to each of the plurality of USB ports.

8. The domestic article according to claim 7
    wherein the stand is a structure comprising a frame, a plurality of slots, and a plurality of dividers;
    wherein the frame is further defined with a first face and a second face;
    wherein the frame is a rectangular block structure that further comprises a bottom cavity and a slot cavity;
    wherein the plurality of slots and the plurality of dividers are contained within the frame.

9. The domestic article according to claim 8
    wherein the slot cavity is a first empty space that is formed in the first face;
    wherein the plurality of slots is formed by inserting the plurality of dividers into the slot cavity such that a slot is formed between a structure selected from the group consisting of the space between two adjacent dividers selected from the plurality of dividers and the space between a divider selected from the plurality of dividers and the frame.

10. The domestic article according to claim 9 wherein each slot selected from the plurality of slots is sized to receive an individual personal data device.

11. The domestic article according to claim 10
    wherein the bottom cavity is a second empty space that is formed in the second face of the frame;
    wherein the inductive coil is installed in the bottom cavity such that the inductive coil runs underneath each of the plurality of slots.

12. The domestic article according to claim 11 wherein the switch, the AC AC converter and the AC DC converter are further mounted in the bottom cavity.

13. The domestic article according to claim 12 wherein the plurality of USB ports are mounted in the frame.

14. The domestic article according to claim 13 wherein the frequency applied to the inductive coil ranges between 100 kHz and 400 kHz.

15. The domestic article according to claim 13 wherein the frequency applied to the inductive coil ranges between 6.5 MHz and 7.0 MHz.

16. The domestic article according to claim 1
    wherein the stand is a structure comprising a frame, a plurality of slots, and a plurality of dividers;
    wherein the frame is further defined with a first face and a second face;
    wherein the frame is a rectangular block structure that further comprises a bottom cavity and a slot cavity;
    wherein the plurality of slots and the plurality of dividers are contained within the frame;
    wherein the slot cavity is a first empty space that is formed in the first face;

wherein the plurality of slots is formed by inserting the plurality of dividers into the slot cavity such that a slot is formed between a structure selected from the group consisting of the space between two adjacent dividers selected from the plurality of dividers and the space between a divider selected from the plurality of dividers and the frame;

wherein each slot selected from the plurality of slots is sized to receive an individual personal data device;

wherein the bottom cavity is a second empty space that is formed in the second face of the frame.

17. The domestic article according to claim 16 wherein the charging circuit comprises a power port, an AC AC converter, an AC DC converter, an inductive coil, a plurality of USB ports and a switch;

wherein the inductive coil is connected to the AC AC converter;

wherein the plurality of USB ports are connected to the AC DC converter;

wherein the switch connects the AC AC converter to the power port;

wherein the switch connects the AC DC converter to the power port;

wherein the power port receives a plug from the cable;

wherein the switch makes and breaks the circuit between the power port and the AC AC converter;

wherein the switch makes and breaks the circuit between the power port and the AC DC converter;

wherein the AC AC converter converts electric power received from the power port and converts the electric power to a predetermined frequency and voltage;

wherein the predetermined frequency and voltage is applied to the inductive coil;

wherein the AC DC converter receives electric power from the power port and converts the electric power into a DC voltage;

wherein the AC DC converter is connected to the plurality of USB ports such that electrical power is provided to each of the plurality of USB ports;

wherein the switch, the AC AC converter and the AC DC converter are further mounted in the bottom cavity;

wherein the plurality of USB ports are mounted in the frame.

18. The domestic article according to claim 17 wherein the inductive coil is inductively coupled to the PDD inductive coil;

wherein the inductive coil is installed in the bottom cavity such that the inductive coil runs underneath each of the plurality of slots.

* * * * *